United States Patent
Rayl et al.

(10) Patent No.: US 10,287,995 B2
(45) Date of Patent: May 14, 2019

(54) SYSTEM AND METHOD FOR CONTROLLING A VARIABLE VALVE ACTUATION SYSTEM TO REDUCE DELAY ASSOCIATED WITH REACTIVATING A CYLINDER

(71) Applicant: GM Global Technology Operations LLC, Detroit, MI (US)

(72) Inventors: Allen B. Rayl, Waterford, MI (US); Daniel G. Brennan, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 15/392,243

(22) Filed: Dec. 28, 2016

(65) Prior Publication Data
US 2017/0107917 A1    Apr. 20, 2017

Related U.S. Application Data

(62) Division of application No. 13/568,690, filed on Aug. 7, 2012, now Pat. No. 9,567,928.

(51) Int. Cl.
| | |
|---|---|
| *F02D 13/06* | (2006.01) |
| *F02D 41/00* | (2006.01) |
| *F02P 5/15* | (2006.01) |
| *F02D 13/02* | (2006.01) |
| *F02P 9/00* | (2006.01) |
| *F01L 9/02* | (2006.01) |
| *F01L 9/04* | (2006.01) |

(52) U.S. Cl.
CPC ......... *F02D 13/06* (2013.01); *F02D 13/0215* (2013.01); *F02D 41/0087* (2013.01); *F02P 5/1504* (2013.01); *F01L 9/02* (2013.01); *F01L 9/04* (2013.01); *F02D 2041/001* (2013.01); *F02D 2200/60* (2013.01); *F02P 9/00* (2013.01); *Y02T 10/18* (2013.01); *Y02T 10/46* (2013.01)

(58) Field of Classification Search
CPC ...... F02D 41/0087; F02D 13/06; F02D 17/02; F02D 2041/0012; F02D 2041/001; F02D 13/0215; F02D 2200/60; F02P 5/1504; F02P 9/00; F01L 9/02; F01L 9/04; Y02T 10/18; Y02T 10/46
USPC ........................................................ 123/198 F
See application file for complete search history.

(56) References Cited

U.S. PATENT DOCUMENTS

| | | |
|---|---|---|
| 1,703,858 A | 3/1929 | Banner |
| 3,157,166 A | 11/1964 | MacNeill |
| 3,926,159 A | 12/1975 | Michelson et al. |
| 4,000,756 A | 1/1977 | Ule et al. |
| 4,009,695 A | 3/1977 | Ule |
| 4,044,652 A | 8/1977 | Lewis et al. |
| 4,459,946 A | 7/1984 | Burandt |

(Continued)

FOREIGN PATENT DOCUMENTS

| | | |
|---|---|---|
| CN | 1847627 A | 10/2006 |
| CN | 101576016 A | 11/2009 |
| CN | 101806252 A | 8/2010 |

*Primary Examiner* — Sizo B Vilakazi

(57) ABSTRACT

An engine control system includes a cylinder control module that deactivates and reactivates a cylinder of an engine based on a driver torque request while an ignition system associated with the engine is in an on position. A firing order module selectively adjusts a firing order of the engine based on a time when the cylinder is reactivated.

9 Claims, 3 Drawing Sheets

(56) References Cited

U.S. PATENT DOCUMENTS

| | | |
|---|---|---|
| 4,807,517 A | 2/1989 | Daeschner |
| 5,267,541 A | 12/1993 | Taguchi et al. |
| 5,373,818 A | 12/1994 | Unger |
| 5,421,545 A | 6/1995 | Schexnayder |
| 5,546,222 A | 8/1996 | Plaessmann et al. |
| 5,572,961 A | 11/1996 | Schechter et al. |
| 5,638,781 A | 6/1997 | Sturman |
| 5,881,689 A | 3/1999 | Hochholzer |
| 6,109,284 A | 8/2000 | Johnson et al. |
| 6,112,711 A | 9/2000 | Shimizu et al. |
| 6,263,842 B1 | 7/2001 | De Ojeda et al. |
| 6,374,784 B1 | 4/2002 | Tischer et al. |
| 6,505,584 B2 | 1/2003 | Lou |
| 6,688,267 B1 | 2/2004 | Raghavan |
| 6,691,652 B2 | 2/2004 | Kammerdiener et al. |
| 6,739,293 B2 | 5/2004 | Turner et al. |
| 6,748,916 B2 | 6/2004 | Schaefer-Siebert |
| 6,810,844 B2 | 11/2004 | Sellnau |
| 6,868,811 B2 | 3/2005 | Koro et al. |
| 6,886,510 B2 | 5/2005 | Sun et al. |
| 6,966,287 B1 | 11/2005 | Livshiz et al. |
| 6,981,475 B2 | 1/2006 | Turquis |
| 7,025,326 B2 | 4/2006 | Lammert et al. |
| 7,278,392 B2 | 10/2007 | Zillmer et al. |
| 7,580,779 B2 | 8/2009 | Zillmer et al. |
| 7,644,688 B2 | 1/2010 | Marriott et al. |
| 7,685,976 B2 | 3/2010 | Marriott |
| 7,748,353 B2 | 7/2010 | Russell et al. |
| 8,171,900 B2 | 5/2012 | Cowgill |
| 8,224,537 B2 | 7/2012 | Olsson et al. |
| 8,347,836 B2 | 1/2013 | Leone et al. |
| 8,386,150 B2 | 2/2013 | Whitney et al. |
| 8,494,742 B2 | 7/2013 | Nanua |
| 8,602,002 B2 | 12/2013 | Brennan |
| 9,169,787 B2 | 10/2015 | Brennan |
| 2002/0177939 A1 | 11/2002 | Kabasin |
| 2003/0015155 A1 | 1/2003 | Turner et al. |
| 2003/0062019 A1 | 4/2003 | Schaefer-Siebert |
| 2003/0172885 A1 | 9/2003 | Gaessler et al. |
| 2003/0172900 A1 | 9/2003 | Boyer et al. |
| 2004/0069272 A1 | 4/2004 | Allen et al. |
| 2006/0144356 A1 | 7/2006 | Sellnau et al. |
| 2006/0169231 A1 | 8/2006 | Fuwa |
| 2007/0006831 A1 | 1/2007 | Leone et al. |
| 2007/0234982 A1 | 10/2007 | Kolmanovsky et al. |
| 2007/0240659 A1 | 10/2007 | Rozario et al. |
| 2007/0256651 A1 | 11/2007 | Marriott et al. |
| 2008/0173264 A1 | 7/2008 | Sun |
| 2009/0007866 A1 | 1/2009 | Nakamura |
| 2009/0014672 A1 | 1/2009 | Schiemann |
| 2009/0070016 A1 | 3/2009 | Rayl |
| 2009/0118977 A1 | 5/2009 | Whitney et al. |
| 2009/0173314 A1 | 7/2009 | Whitney et al. |
| 2009/0229562 A1 | 9/2009 | Ramappan et al. |
| 2009/0229563 A1 | 9/2009 | Rayl et al. |
| 2009/0277407 A1 | 11/2009 | Ezaki |
| 2009/0283070 A1 | 11/2009 | Whitney et al. |
| 2010/0192925 A1 | 8/2010 | Sadakane |
| 2010/0211297 A1 | 8/2010 | Doering et al. |
| 2010/0307433 A1 | 12/2010 | Rust et al. |
| 2011/0073069 A1 | 3/2011 | Marriott et al. |
| 2011/0139117 A1 | 6/2011 | Kar et al. |
| 2011/0144894 A1 | 6/2011 | Marriott et al. |
| 2011/0197833 A1 | 8/2011 | Vorih et al. |
| 2012/0031373 A1 | 2/2012 | Brennan |
| 2012/0097121 A1 | 4/2012 | Brennan et al. |
| 2012/0116647 A1* | 5/2012 | Pochner .................. F02D 17/02 701/102 |
| 2012/0168654 A1 | 7/2012 | Marriott |
| 2012/0204832 A1 | 8/2012 | Baur et al. |
| 2013/0261935 A1 | 10/2013 | Jankovic |
| 2013/0317725 A1* | 11/2013 | Brennan ............. F02D 41/0087 701/105 |
| 2014/0039776 A1 | 2/2014 | Cowgill |
| 2014/0041624 A1 | 2/2014 | Rayl et al. |
| 2014/0352659 A1* | 12/2014 | Glugla ................ F02D 41/0082 123/350 |

\* cited by examiner

SYSTEM AND METHOD FOR CONTROLLING A VARIABLE VALVE ACTUATION SYSTEM TO REDUCE DELAY ASSOCIATED WITH REACTIVATING A CYLINDER

CROSS-REFERENCE TO RELATED APPLICATIONS

This application is a divisional of co-pending U.S. patent application Ser. No. 13/568,690 filed Aug. 7, 2012.

FIELD

The present disclosure relates to systems and methods for controlling a variable valve actuation system to reduce delay associated with reactivating a cylinder.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture within cylinders to drive pistons, which produces drive torque. Air enters the cylinders through intake valves. Fuel may be mixed with the air before or after the air enters the cylinders. In spark-ignition engines, spark initiates combustion of the air/fuel mixture in the cylinders. In compression-ignition engines, compression in the cylinders combusts the air/fuel mixture in the cylinders. Exhaust exits the cylinders through exhaust valves.

A valve actuator actuates the intake and exhaust valves. The valve actuator may be driven by a camshaft. For example, the valve actuator may be a hydraulic lifter that is coupled to the camshaft using a pushrod or directly coupled to the camshaft. Alternatively, the valve actuator may actuate the intake and exhaust valves independent from a camshaft. For example, the valve actuator may be hydraulic, pneumatic, or electromechanical, and may be used in a camless engine and/or a camless valvetrain.

SUMMARY

A system according to the principles of the present disclosure includes a cylinder control module and a valve control module. The cylinder control module deactivates and reactivates a cylinder of an engine based on a driver torque request while an ignition system associated with the engine is in an on position. The valve control module selectively adjusts a period for which at least one of an intake valve and an exhaust valve of the cylinder are opened based on a first time when the cylinder is reactivated.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine control system may deactivate one or more cylinders of an engine to improve fuel economy. When a cylinder is deactivated, fuel delivery to the cylinder and/or spark generation in the cylinder may be stopped. In addition, an intake valve and an exhaust valve of the cylinder may be closed to trap exhaust gas in the cylinder. Trapping exhaust gas in the cylinder reduces pumping losses associated with pumping air into and out of the cylinder and thereby improves fuel economy.

When the cylinder is reactivated, the exhaust valve may be opened to vent exhaust gas from the cylinder. The exhaust valve may be closed when a piston in the cylinder is at its topmost position, referred to as top dead center (TDC). The exhaust valve may be opened for a fixed period each engine cycle. For example, if the exhaust valve is opened using a valvetrain that is driven by a camshaft of the engine, the period when the exhaust valve is opened may depend on rotation of the camshaft. If the cylinder is reactivated during the period when the exhaust valve would have been open if it was not deactivated, the exhaust valve may not be opened until the exhaust stroke of the next engine cycle. In turn, the torque response of the engine may be delayed.

A system and method according to the principles of the present disclosure opens an exhaust valve of a cylinder when the cylinder is reactivated if a period before a piston in the cylinder reaches TDC is sufficient to vent exhaust gas from the cylinder. The period when the exhaust valve is opened may be varied using a camless valvetrain. Thus, the exhaust valve may be opened at a later time and for a shorter period when the cylinder is reactivated. For example, the exhaust valve may be opened during the period when the exhaust valve would have been open if it was not deactivated.

If the period before the piston reaches TDC is not sufficient to vent exhaust gas from the cylinder, the firing order of the engine may be adjusted. For example, the spark timing of the reactivated cylinder may be advanced by 360 degrees without adjusting the spark timing of the other cylinders in the engine. The exhaust valve may then be opened during the next piston stroke. Opening the exhaust valve when the cylinder is reactivated, or during the next piston stroke, instead of waiting for the exhaust stroke of the next engine cycle improves the torque response of the engine.

Figure 1:
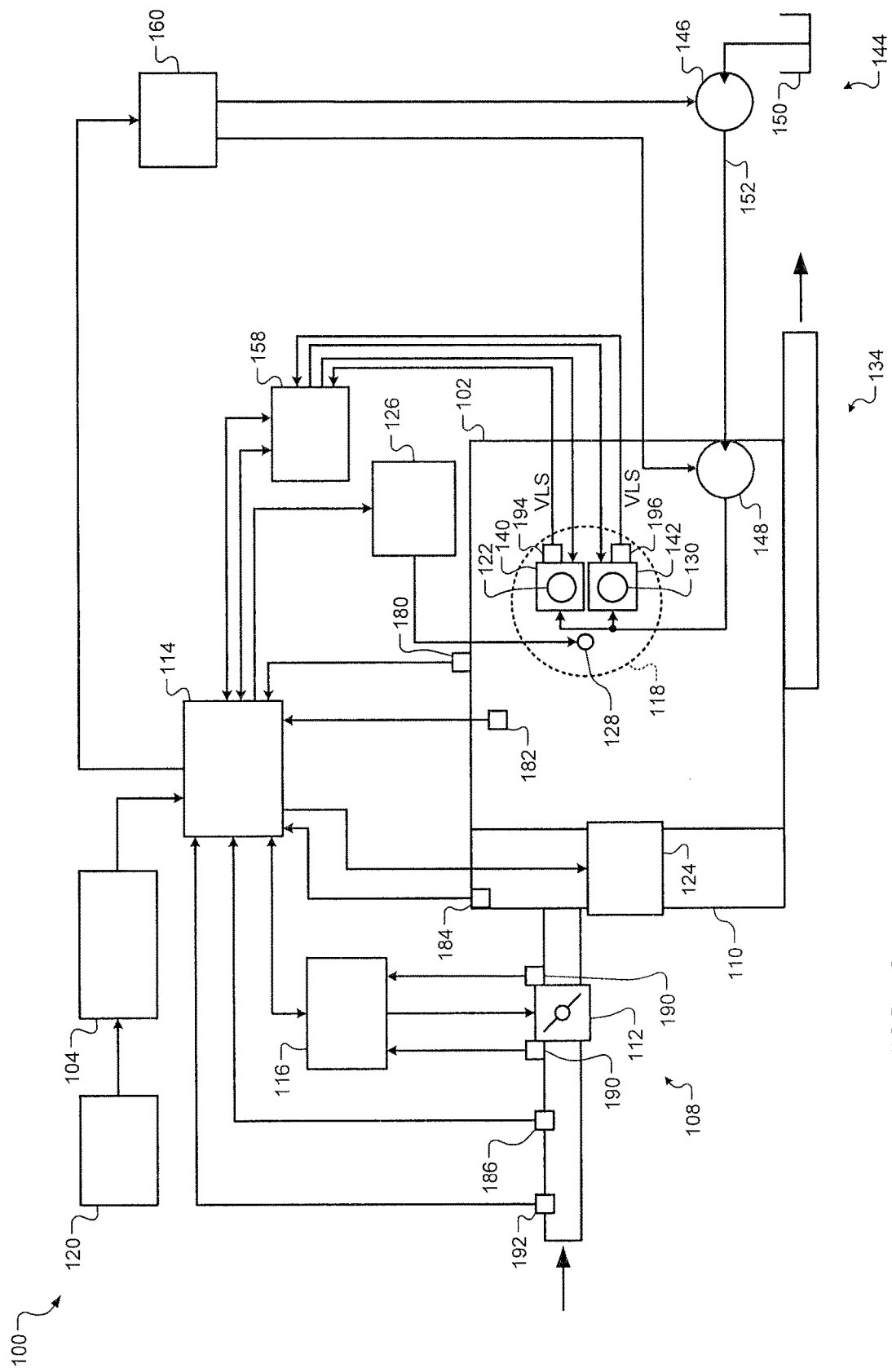
FIG. 1 is a functional block diagram illustrating an example engine system according to the principles of the present disclosure.

Referring now to FIG. 1, an example implementation of an engine system 100 includes an engine 102 that combusts an air/fuel mixture to produce drive torque for a vehicle based on driver input from a driver input module 104. Air is drawn into the engine 102 through an intake system 108. In various examples, the intake system 108 includes an intake manifold 110 and a throttle valve 112. In various examples, the throttle valve 112 includes a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. In various examples, the engine 102 includes 2, 3, 4, 5, 6, 8, 10, or 12 cylinders. The ECM 114 deactivates one or more cylinders of the engine 102 under certain engine operating conditions to improve fuel economy. The ECM 114 may deactivate all of the cylinders, or less than all of the cylinders, while an ignition system 120 is in an on position. The ECM 114 starts and stops the engine 102 based on input received from the ignition system 120 via the driver input module 104.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel is injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crank angle. In various implementations, the spark actuator module 126 may halt provision of spark to deactivated cylinders.

Generating the spark may be referred to as a firing event. The spark actuator module 126 is able to vary the timing of the spark for each firing event. The spark actuator module 126 is capable of varying the spark timing for a next firing event when the spark timing signal is changed between a last firing event and the next firing event. In various implementations, the spark actuator module 126 varies the spark timing relative to TDC by the same amount for all of the cylinders in the engine 102.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be actuated using an intake valve actuator 140, while the exhaust valve 130 may be actuated using an exhaust valve actuator 142. In various implementations, the intake valve actuator 140 may actuate multiple intake valves (including the intake valve 122) for the cylinder 118. Similarly, the exhaust valve actuator 142 may actuate multiple exhaust valves (including the exhaust valve 130) for the cylinder 118. Additionally, a single valve actuator may actuate one or more exhaust valves for the cylinder 118 and one or more intake valves for the cylinder 118.

The intake valve actuator 140 and the exhaust valve actuator 142 actuate the intake valve 122 and the exhaust valve 130, respectively, independent from a camshaft. In this regard, the valve actuators 140, 142 may be hydraulic, pneumatic, or electromechanical and may be used in a camless valvetrain, and the engine 102 may be a camless engine. As presently shown, the valve actuators 140, 142 are hydraulic, and a hydraulic system 144 supplies hydraulic fluid to the valve actuators 140, 142.

The hydraulic system 144 includes a low-pressure pump 146, a high-pressure pump 148, and a reservoir 150. The low-pressure pump 146 supplies hydraulic fluid from the reservoir 150 to the high-pressure pump 148 through a supply line 152. The high-pressure pump 148 supplies hydraulic fluid from the supply line 152 to the valve actuators 140, 142. The low-pressure pump 146 may be an electric pump, and the high-pressure pump 148 may be driven by the engine 102 using, for example, a belt.

A valve actuator module 158 controls the intake valve actuator 140 and the exhaust valve actuator 142 based on signals from the ECM 114. The valve actuator module 158 may control the intake valve actuator 140 to adjust the lift, duration, and/or timing of the intake valve 122. The valve actuator module 158 may control the exhaust valve actuator 142 to adjust the lift, duration, and/or timing of the exhaust valve 130.

A pump actuator module 160 controls the low-pressure pump 146 and the high-pressure pump 148 based on signals from the ECM 114. The pump actuator module 160 may control the low-pressure pump 146 to adjust the pressure of hydraulic fluid supplied to the high-pressure pump 148. The pump actuator module 160 may control the high-pressure pump 148 to adjust the pressure of hydraulic fluid supplied to the valve actuators 140, 142.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown). The pressure within the intake manifold 110 may be measured using a manifold absolute pressure (MAP) sensor 184.

The mass flow rate of air flowing into the intake manifold 110 may be measured using a mass air flow (MAF) sensor 186. In various implementations, the MAF sensor 186 may be located in a housing that also includes the throttle valve 112. The position of the throttle valve 112 may be measured using one or more throttle position sensors (TPS) 190. The ambient temperature of air being drawn into the engine 102 may be measured using an intake air temperature (IAT) sensor 192.

The lift of the intake valve 122 may be measured using an intake valve lift (IVL) sensor 194. The lift of the exhaust valve 130 may be measured using an exhaust valve lift (EVL) sensor 196. The valve lift sensors 194, 196 may output the lift of the intake and exhaust valves 122, 130 to the valve actuator module 158, as shown, and the valve actuator module 158 may output the lift of the intake and exhaust valves 122, 130 to the ECM 114. Alternatively, the valve lift sensors 194, 196 may output the lift of the intake and exhaust valves 122, 130 directly to the ECM 114. The ECM 114 may use signals from the sensors to make control decisions for the engine system 100.

Figure 2:
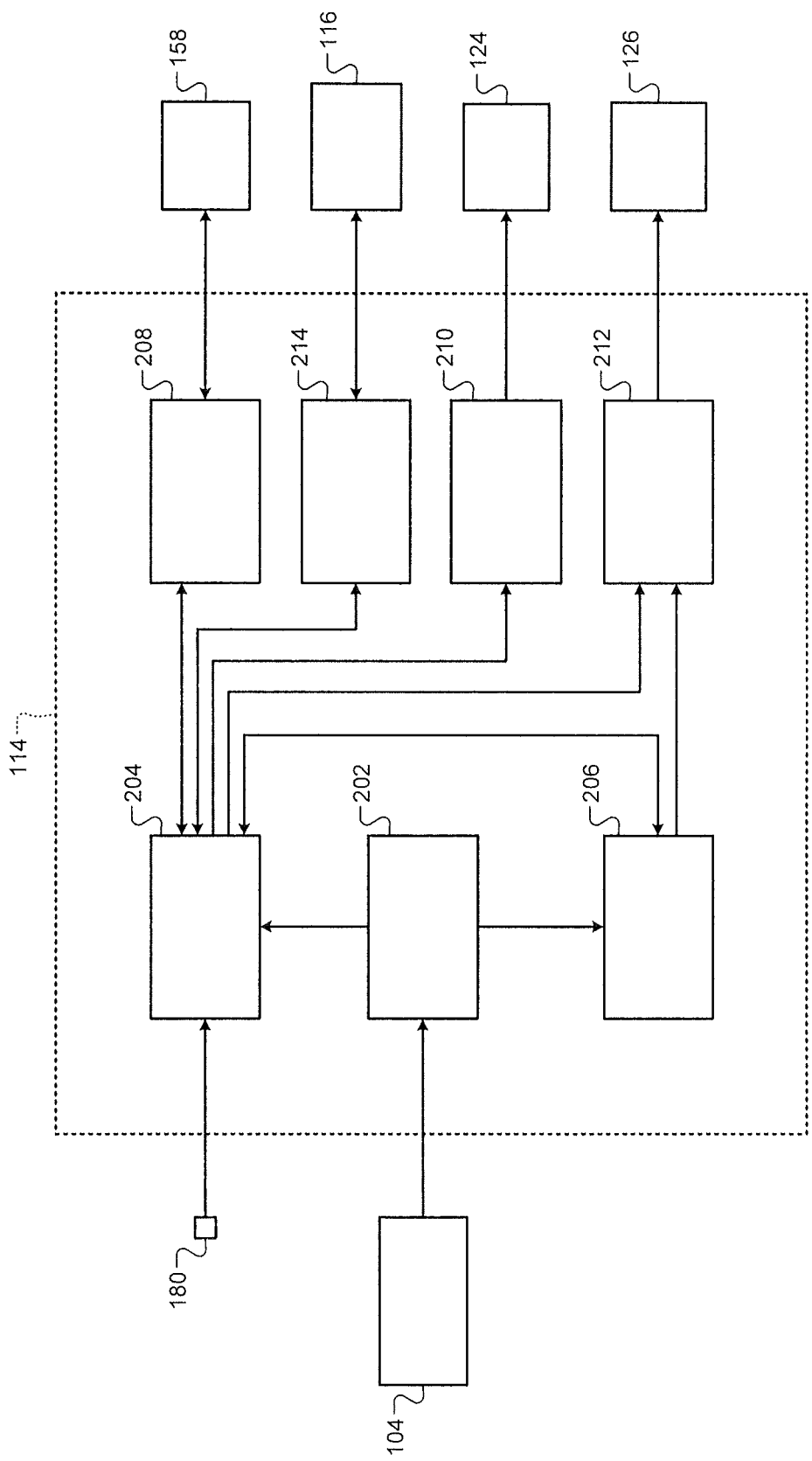
FIG. 2 is a functional block diagram illustrating an example engine control system according to the principles of the present disclosure.

Referring now to FIG. 2, an example implementation of the ECM 114 includes a driver torque module 202, a cylinder control module 204, and a firing order module 206. The driver torque module 202 determines a driver torque request based on driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings.

The cylinder control module 204 may deactivate one or more cylinders of the engine 102, such as the cylinder 118. In various implementations, a predefined group of cylinders are deactivated jointly. The cylinder control module 204 may instruct a valve control module 208 to close the intake and exhaust valves of deactivated cylinders. The valve control module 208 outputs a signal to the valve actuator module 158 to open or close the intake valve 122 and/or the exhaust valve 130.

The valve control module 208 may time the closing of the intake valve 122 and the exhaust valve 130 to trap exhaust gas in the cylinder 118 while the cylinder 118 is deactivated. In various examples, the valve control module 208 closes the intake valve 122 after the cylinder 118 completes an intake stroke and closes the exhaust valve 130 before the cylinder 118 completes an exhaust stroke. Trapping exhaust gas in a cylinder when the cylinder is deactivated reduces pumping losses of the cylinder.

The cylinder control module 204 instructs a fuel control module 210 to stop providing fuel to deactivated cylinders. The fuel control module 210 outputs a signal to the fuel actuator module 124 to adjust fuel delivery to the cylinder 118. The cylinder control module 204 may or may not instruct a spark control module 212 to stop providing spark to deactivated cylinders. In various implementations, the spark control module 212 only stops providing spark to a cylinder once any fuel/air mixture already present in the cylinder has been combusted. The spark control module 212 outputs a signal to the spark actuator module 126 to adjust spark generation in the cylinder 118.

The cylinder control module 204 reactivates the cylinder 118 when the driver torque request is greater than a first torque, which may be predetermined. When the driver torque request is less than or equal to the first torque, the cylinder control module 204 instructs a throttle control module 214 to adjust the throttle valve 112 to satisfy the driver torque request. The throttle control module 214 outputs a signal to the throttle actuator module 116 to adjust the throttle valve 112.

In various implementations, the firing order module 206 adjusts the firing order of the engine 102 and/or the valve control module 208 adjusts the valve timing of the engine 102 only when the driver torque request is greater than a second torque. The cylinder control module 204 may determine whether the driver torque request is greater than the second torque. The second torque may be predetermined and may correspond to a percentage (e.g., 90 percent) of wide open throttle.

The valve control module 208 may adjust valve timing during the current engine cycle based on a first time when the cylinder 118 is reactivated. The valve control module 208 opens the intake and exhaust valves 122, 130 normally when a crank angle corresponding to the first time is greater than or equal to a first angle. The crank angle may be specified in number of degrees before TDC. The cylinder control module 204 may determine the crank angle based on input from the CKP sensor 180.

When opening the exhaust valve 130 normally, the valve control module 208 opens the exhaust valve 130 for a first period. When a period before the piston reaches TDC is less than the first period, the valve control module 208 may not open the exhaust valve 130 until the next engine cycle. The cylinder control module 204 may determine the period before the piston reaches TDC based on the crank angle and engine speed. Engine speed is determined based on input from the CKP sensor 180. When the valve control module 208 opens the intake valve 122 normally, the valve control module 208 opens the intake valve 122 before the exhaust valve 130 closes.

When the crank angle corresponding to the first time is less than the first angle but greater than a second angle, the valve control module 208 opens the exhaust valve 130 for a second period that is less than the first period. In addition, the valve control module 208 does not open the intake valve 122 until the exhaust valve 130 closes to prevent valve overlap. Pressure in the cylinder 118 may be high due to the shortened period during which exhaust gas is vented from the cylinder 118. Preventing valve overlap ensures that exhaust gas is not forced through the intake valve 122. After adjusting valve timing based on the first time, the valve control module 208 opens the intake and exhaust valves 122, 130 normally during the next engine cycle.

When the crank angle corresponding to the first time is less than or equal to the second angle, the firing order module 206 adjusts the firing order of the engine 102. The firing order module 206 may advance the spark timing of the cylinder 118 by 360 degrees without advancing the spark timing of other cylinders in the engine 102. The firing order module 206 may notify the cylinder control module 204 when the firing order module advances the spark timing of the cylinder 118 by 360 degrees. In turn, the valve control module 208 and the fuel control module 212 may adjust valve timing and fuel injection timing, respectively, based on the advanced spark timing.

Thus, if the period prior to TDC is less than the first period, the valve control module 208 does not wait nearly a full engine cycle before opening the exhaust valve 130. Instead, the valve control module 208 opens the exhaust valve 130 during the next piston stroke. The valve control module 208 opens the exhaust valve 130 for the first period and closes the exhaust valve 130 at or near TDC of the next piston stroke.

Figure 3:
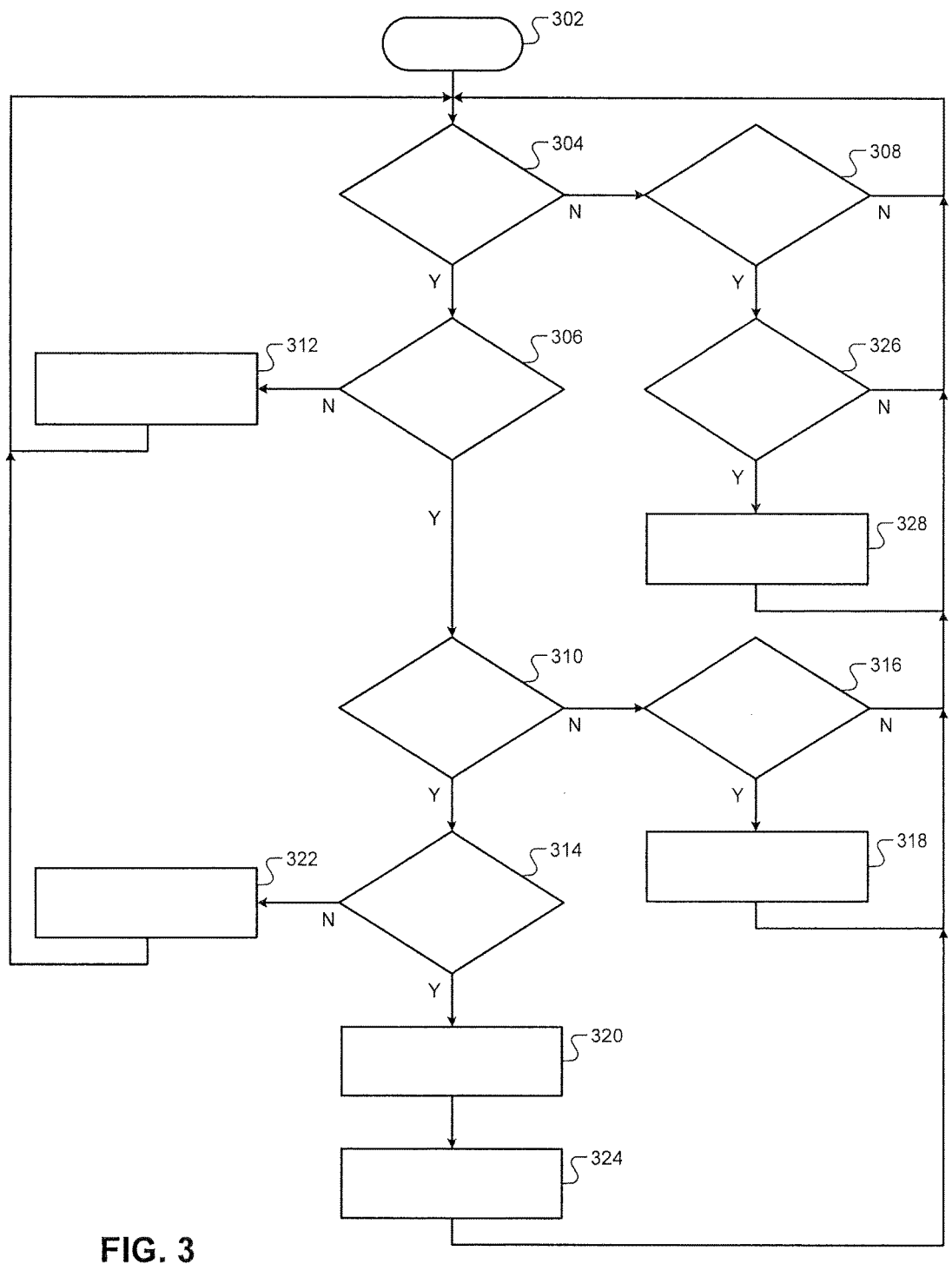
FIG. 3 is a flowchart illustrating an example engine control method according to the principles of the present disclosure.

Referring now to FIG. 3, a method for reducing delay in the torque response of an engine associated with reactivating a cylinder of the engine begins at 302. At 304, the method determines whether the cylinder is deactivated. If the cylinder is deactivated, the method continues at 306. Otherwise, the method continues at 308.

At 306, the method determines whether a driver torque request is greater than a first torque. The driver torque request may be determined based on driver input such as an accelerator pedal position or a cruise control setting. The first torque may be predetermined. If the driver torque request is greater than the first torque, the method continues at 310. Otherwise, the method continues at 312. At 312, the method satisfies the driver torque request by adjusting a position of a throttle valve.

At 310, the method determines whether the driver torque request is greater than a second torque. The second torque may be predetermined and may be a percentage (e.g., 90 percent) of wide open throttle. If the driver torque request is greater than the second torque, the method continues to 314. Otherwise, the method continues to 316.

At 316, the method determines whether a crank angle corresponding to a first time when the cylinder is reactivated is greater than or equal to a first angle. The crank angle may represent an amount of crankshaft rotation before a piston in the cylinder reaches TDC. If the crank angle is greater than or equal to the first angle, the method continues at 318. Otherwise, the method returns to 304. At 318, the method opens an exhaust valve of the cylinder for a first period. The first angle and the first period may be predetermined and may correspond to normal operation. If the crank angle is less than the first angle, the method may open the exhaust valve during an exhaust stroke of the next engine cycle.

At 314, the method determines whether the crank angle is greater than a second angle. If the crank angle is greater than the second angle, the method continues at 320. Otherwise, the method continues at 322. At 320, the method opens the exhaust valve for a second period that is less than the first period. The second period may be predetermined based on an amount of time required to vent exhaust gas from the cylinder. At 324, the method delays opening the intake valve until after the exhaust valve is closed to prevent valve overlap.

At 322, the method adjusts a firing order of the engine. For example, the method may advance the spark timing of the cylinder by 360 degrees without advancing the spark timing of other cylinders in the engine. The method may adjust the valve timing and the fuel injection timing of the cylinder based on the advanced spark timing.

At 308, the method determines whether the firing order of the engine is out of sequence. The firing order of the engine may be out of sequence when the spark timing of the cylinder is advanced by 360 degrees. When the firing order of the engine is out of sequence, the method continues at 326. Otherwise, the method returns to 304. By opening the exhaust valve for the second period or advancing the spark timing of the cylinder by 360 degrees, the method improves the torque response of the engine.

At 326, the method determines whether the driver torque request is decreasing. If the driver torque request is decreasing, the method continues at 328. Otherwise, the method returns to 304. At 328, the method skips a firing event and readjusts the firing order of the engine so that the firing order is not out of sequence. The method may readjust the firing order of the engine by retarding the spark timing of the cylinder by 360 degrees.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An engine control system comprising:
   a cylinder control module that deactivates and reactivates a cylinder of an engine based on a driver torque request while an ignition system associated with the engine is in an on position; and
   a firing order module that selectively adjusts a firing order of the engine based on a crank angle of the engine at a time when the cylinder is reactivated.

2. The engine control system of claim 1, wherein the firing order module adjusts the firing order when the driver torque request is greater than a predetermined torque.

3. The engine control system of claim 1, wherein the firing order module advances spark in the cylinder by N degrees when the crank angle is less than a predetermined angle.

4. The engine control system of claim 3, wherein the crank angle corresponds to a piston position at the time relative to top dead center, and N is an integer greater than 1.

5. The engine control system of claim 4, wherein N is 360.

6. A method for controlling an engine, comprising:
   deactivating and reactivating a cylinder of the engine based on a driver torque request while an ignition system associated with the engine is in an on position; and
   selectively adjusting a duration of a period for which at least one of an intake valve and an exhaust valve of the cylinder are opened based on a first time corresponding to a crank angle of the engine when the cylinder is reactivated relative to top dead center;

opening the exhaust valve at a second time that is based on the first time opening the exhaust valve when the cylinder is reactivated if the crank angle is greater than a first predetermined angle; and adjusting a firing order of the engine based on the first time.

7. The method of claim 6, further comprising adjusting the firing order when the driver torque request is greater than a predetermined torque.

8. The method of claim 6, further comprising advancing spark in the cylinder by N degrees when the crank angle is less than or equal to the predetermined angle, wherein N is an integer greater than 1.

9. The method of claim 8, wherein N is 360.

* * * * *